(12) United States Patent
Takada et al.

(10) Patent No.: US 7,166,487 B2
(45) Date of Patent: Jan. 23, 2007

(54) MANUFACTURING METHOD OF OPTICAL DEVICES

(75) Inventors: Motoo Takada, Saitama (JP); Kazumasa Adachi, Saitama (JP)

(73) Assignee: Nihon Dempa Kogyo Co., Ltd., Tokyo (JP)

( * ) Notice: Subject to any disclaimer, the term of this patent is extended or adjusted under 35 U.S.C. 154(b) by 169 days.

(21) Appl. No.: 10/983,940

(22) Filed: Nov. 8, 2004

(65) Prior Publication Data
US 2005/0170084 A1    Aug. 4, 2005

(30) Foreign Application Priority Data

| Nov. 11, 2003 | (JP) | ............................. 2003-381197 |
| Nov. 28, 2003 | (JP) | ............................. 2003-399258 |
| Oct. 15, 2004 | (JP) | ............................. 2004-301269 |

(51) Int. Cl.
*H01L 21/00* (2006.01)

(52) U.S. Cl. .................... 438/33; 438/460; 438/113; 438/68; 438/458

(58) Field of Classification Search ................. 438/33, 438/68, 113, 460
See application file for complete search history.

(56) References Cited

U.S. PATENT DOCUMENTS

| 4,904,617 | A | * | 2/1990 | Muschke | ..................... 438/33 |
| 5,314,844 | A | * | 5/1994 | Imamura | ....................... 225/2 |
| 5,418,190 | A | * | 5/1995 | Cholewa et al. | .............. 438/33 |
| 6,830,946 | B1 | * | 12/2004 | Yanagisawa et al. | ......... 438/26 |
| 2005/0056127 | A1 | * | 3/2005 | Yamabuchi et al. | ........... 83/13 |

FOREIGN PATENT DOCUMENTS

JP        6-313811        11/1994

* cited by examiner

*Primary Examiner*—Dung A. Le
(74) *Attorney, Agent, or Firm*—Scott D. Wofsy; Edwards Angell Palmer & Dodge LLP

(57) ABSTRACT

A first objective of the present invention is to provide a more productive method of manufacturing optical devices that minimizes processing distortion, maintains optical characteristics satisfactorily, and promotes smallness. A second objective thereof is to provide a method of manufacturing optical devices that prevents the occurrence of fine dust and maintains the optical characteristics satisfactorily. A third objective thereof is to provide a method of manufacturing optical devices of a multi-layer configuration that are obtained by applying a scribing/cutting method. A method of manufacturing optical devices in accordance with the present invention, wherein an optical wafer having surfaces polished to a mirror finish is divided into a plurality of optical chips, is provided with a first step of providing hairline cracks by a diamond blade edge in one main surface of the optical wafer and a third step of applying pressure along the hairline cracks after the first step, to divide the optical wafer into the plurality of optical chips.

2 Claims, 8 Drawing Sheets

MANUFACTURING METHOD OF OPTICAL DEVICES

BACKGROUND OF THE INVENTION

The present invention relates to a method of manufacturing optical devices such as an optical low-pass filter (hereinafter called an "optical filter") and, in particular, to a method of manufacturing an optical filter in which high quality is maintained.

An optical filter is known in the art as a device that is disposed in front of an imaging device such as a camera, to suppress spurious signals and eliminate problems such as chromatic aberration. As the numbers of optical products have increased recently, and also the demands thereon have become more varied, the requirement is for reliable maintenance of the optical characteristics thereof, such as a high transmitted wave front precision.

A method of manufacturing an optical filter in accordance with the prior art is shown in FIGS. 6 to 7C, where FIG. 6 is a vertical section through an optical filter, FIG. 7A is a vertical section through an optical wafer, FIG. 7B is a vertical section through a stack of multiple optical wafers, and FIG. 7C is a plan view after that optical wafer has been cut into individual optical chips.

Various materials such as crystal (including quartz crystal), plastic, and glass (including IR-cutting glass) are used as optical filters. An optical filter is formed as a single chip of an optical material, or as a stack of a plurality of optical chips, such as three optical chips 1a, 1b, and 1c, as shown in FIG. 6. With an optical filter in particular, an optical thin film 2 for cutting infrared rays is formed on both main surfaces of each of the optical chips 1a, 1b, and 1c, and they are bonded together with an adhesive 3.

The usual method is first to cut three optical wafers 1A, 1B, and 1C of a flat-plate shape from an optical material and polish both main surfaces of each of the optical wafers to a mirror finish (see FIG. 7A), then form the optical thin film 2 for cutting infrared rays on both main surfaces of each of the optical wafers. The optical thin film 2 is formed in multiple layers (not shown in the figures) by a method such as vapor deposition, with a first layer of $Al_2O_3$, a second layer of $ZrO_2$, and a third layer of $MgF_2$, by way of example.

The three optical wafers 1A, 1B, and 1C having the optical thin film 2 formed thereon are bonded together by the adhesive 3, to form a stacked optical wafer (hereinafter called a "multi-layer optical wafer") 4. The multi-layer optical wafer 4 is then cut vertically and horizontally to divide it. In general, the optical wafer 4 is cut by a dicing saw that has a rotating blade of fine particles (powder) of diamond (a diamond wheel) affixed to the outer periphery of a thin circular plate. This makes it possible to obtain a large number of optical devices having a stack of the three optical chips 1a, 1b, and 1c (see Japanese Patent Laid-Open Publication No. 6-313811).

However, with the above prior-art method of manufacturing an optical filter, a portion equivalent to the width of the blade edge of the dicing saw is shaved off the optical wafer 4 during the cutting of the multi-layer optical wafer 4 by the dicing saw. Since this means that wasteful shavings portions are generated from the multi-layer optical wafer 4, the utilization efficiency of the optical material is bad. If the optical material is crystal, in particular, the material costs also pile up, which is wasteful. In such a case, the use of a scribing/cutting method (dividing method) that is used in applications such as cutting liquid-crystal panels is drawing attention from the viewpoint of improving the utilization efficiency of the multi-layer optical wafer 4 (the optical material).

In this scribing/cutting method illustrated in FIGS. 8A and 8B, by way of example, a rotary cutter (not shown in the figures) having diamond as the blade edge thereof is pressed against the optical thin film 2 of the optical wafer 1A from above. This provides hairline cracks (scribed grooves or scratched grooves) 5 as division lines on the surface of the optical wafer 1A. Pressure is the applied from above each hairline crack 5 that acts as a division line, by a dividing device (not shown in the figure) such as a breaker fabricated by Mitsuboshi Diamond, to divide the optical wafer 1A. Since this ensures there are no wasteful cut-off portions from the optical wafer 1A caused by the width of the blade edge, as with a dicing saw, the utilization efficiency is increased by approximately 20%. Note that a single the optical wafer 1A is shown in FIGS. 7 and 8.

If this scribing/cutting method is applied to the multi-layer optical wafer 4 (see FIG. 7B) formed of the three optical wafers 1A, 1B, and 1C, however, a problem arises in that it is difficult to split the optical wafer after the hairline cracks (scribed grooves) 5 have been provided, due to the adhesion of the adhesive 3 interposed between the multiple surfaces of the multi-layer optical wafer 4. In addition, the optical thin film 2 can break up finely during the formation of the horizontal and vertical hairline cracks (division lines) 5 from above the optical thin film 2 formed by a method such as vapor deposition on the surface of the multi-layer optical wafer 4. This leads to a problem in that the optical characteristics are adversely affected by the deposition of fine dust on the main surfaces of the optical device after the splitting of the optical wafer. Note that similar fine dust is also generated when a dicing saw is used, but the fine dust due to scribing can remain attached even after washing.

With the dicing saw of the prior-art example, an amount of optical material of substantially the same quantity as the width of the blade edge is shaved off from the optical wafer, as described previously, while frictional resistance is generated between the optical wafer and the rotating blade during the cutting of the multi-layer optical wafer 4. Thus there are stress concentrations in the vicinity of the processed layers that at the positions of the cuts, due to frictional resistance, causing distortion (processing distortion). This processing distortion remains unchanged on the outer peripheral edges of each optical filter after the optical wafer has been divided, reducing the transmitted wave front precision in those areas and ultimately causing deterioration of the optical characteristics.

It is therefore necessary to reduce the effective area and increase the outer planar dimensions of each optical filter. This impedes any effort to make the optical device smaller and also causes an inevitable problem concerning productivity, especially when making the multi-layer optical wafer 4 even smaller. This not only affects these multi-layer optical wafers 4; similar problems occur when forming an optical filter from a single sheet (a single chip) or forming wavelength plates other than optical filters.

SUMMARY OF THE INVENTION

A first objective of the present invention is to provide a more productive method of manufacturing optical devices that minimizes processing distortion, maintains optical characteristics satisfactorily, and promotes smallness. A second objective of the present invention is to provide a method of manufacturing optical devices that prevents the generation of fine dust and maintains the optical characteristics satisfactorily. A third objective of the present invention is to provide a method of manufacturing optical devices of a multi-layer configuration that are obtained by applying a scribing/cutting method.

The present invention relates to a method of manufacturing optical devices, in which an optical wafer having surfaces polished to a mirror finish is divided into a plurality of optical chips, which is provided with a first step of providing hairline cracks by a diamond blade edge in one main surface of the optical wafer and a third step of applying pressure along the hairline cracks after the first step, to divide the optical wafer into the plurality of optical chips.

Since this configuration is a scribing/cutting method in which pressure is applied to hairline cracks formed by a diamond blade edge on the optical wafer, to split it, there is no frictional resistance generated in the divided surfaces as there is in prior-art cutting methods (such as those using dicing saws), making it possible to suppress processing distortion. Note that the scribing/cutting method has advantages concerning losses of the workpiece due to the blade edge and its processing speed, and it has been specifically discovered that processing distortion of the optical wafer is suppressed by the present invention.

Thus the transmitted wave front precision in the outer peripheral areas of each of the optical devices that are divided from the optical wafer 1A is satisfactory, ensuring the optical characteristics thereof. In addition, since the entire surface of each optical device is the effective area thereof, the device can be made smaller. Furthermore, since there are no wasteful shavings from the cut surfaces due to the dicing saw, an especially large number of devices can be produced from the optical wafer, improving productivity.

BRIEF DESCRIPTION OF THE DRAWINGS

FIG. 1 is illustrative of an embodying example of the manufacturing method of the present invention, where

FIG. 3 is further illustrative of the embodying example of the present invention, where

FIG. 7 is illustrative of the prior-art example, wherein FIG. 8 is also illustrative of the prior-art example, where

DETAILED DESCRIPTION OF PREFERRED EMBODIMENTS

The present invention relates a manufacturing method that is provided with a first step of forming hairline cracks with a diamond blade edge in one main surface of an optical wafer, followed by a second step of forming an optical thin film on the optical wafer. Since the optical thin film is formed on the wafer surface after the formation of the hairline cracks (scribed grooves) by the diamond blade edge in one main surface of the optical wafer in the first step, this prevents the occurrence of fine dust that is generated during the formation of the hairline cracks. It is therefore possible to prevent the adhesion of fine dust to the optical device, ensuring that the optical characteristics thereof can be maintained satisfactorily.

In addition, the present invention relates to a manufacturing method that is provided with a fourth step of bonding together the optical chips with adhesive to form a stack, after a third step of applying pressure to the hairline cracks after the first step, to divide the optical wafer into a plurality of optical chips. Since the optical chips are bonded by the adhesive into the multi-layer stack after the optical wafer has been divided into optical chips in the third step, a multi-layer type of optical device is obtained by using the scribing/cutting method. In other words, the present invention does not involve using the scribing/cutting method to divide up a multi-layer optical wafer that has been bonded together with an adhesive; it involves using the scribing/cutting method to cut apart a single optical wafer then stacking the resultant optical chips. This therefore enables the application of the scribing/cutting method to a multi-layer optical device that is bonded together with adhesive.

The optical device of the present invention could be an optical filter. This makes it possible to achieve an optical filter that provides the above-described effects.

Furthermore, the optical chip of the present invention is configured of an optical material such as crystal, plastic, or glass. This enables specific designation of the material of the optical chip. If crystal is particularly preferred as one of such optical materials, this invention is particularly effective since crystal is expensive.

Embodiments

Figure 1A:
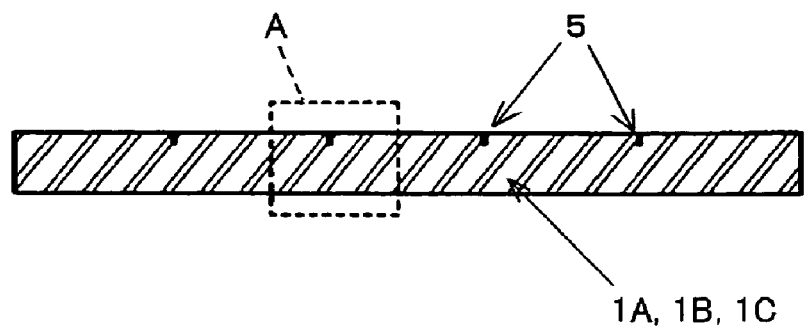
FIG. 1A is a vertical section through an optical wafer and FIG. 1B is a plan view thereof.
Figure 1B:
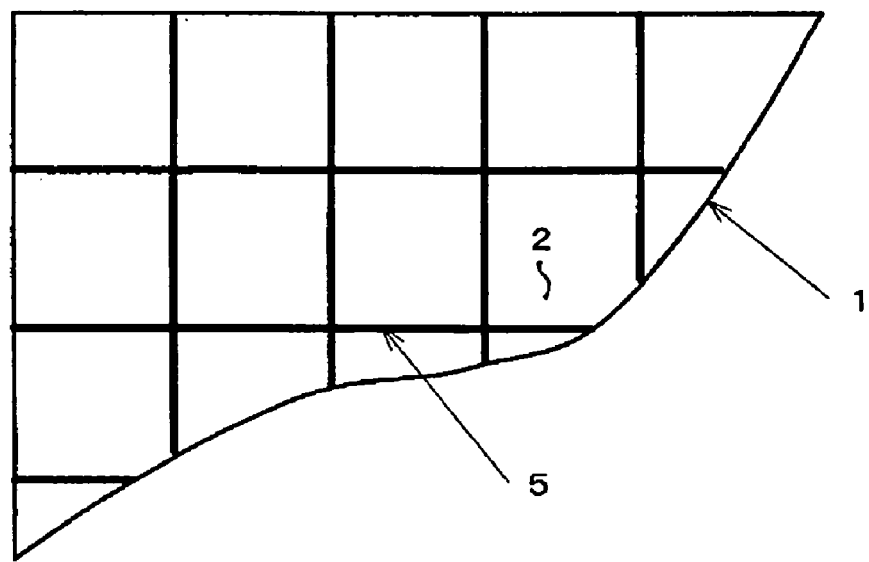
Figure 2:
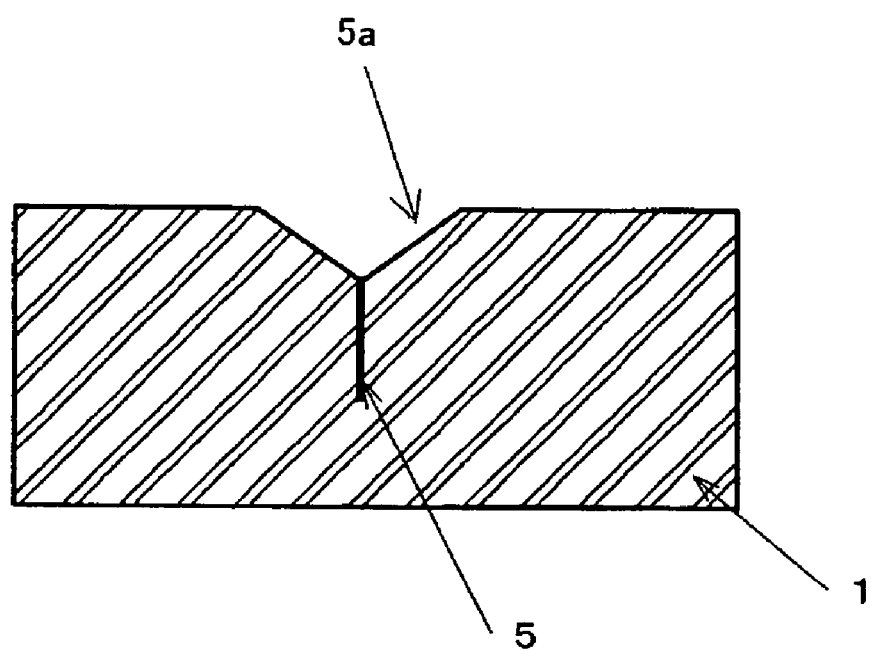
FIG. 2 is a partial expanded view of the portion within the dotted frame in FIG. 1A, illustrating the embodying example of the present invention.
Figure 3A:
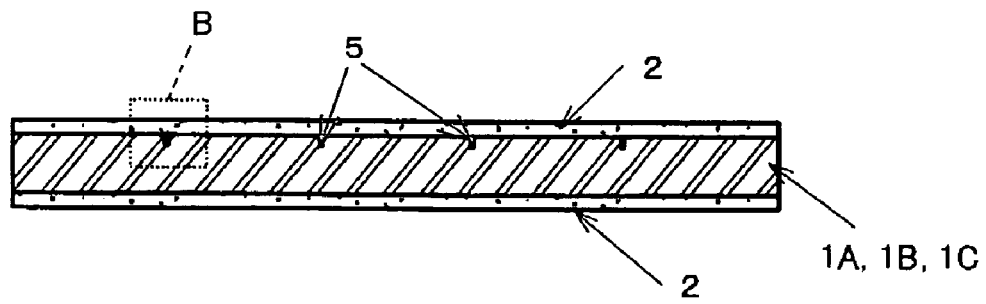
FIG. 3A is a vertical section through an optical wafer that is provided with an optical thin film and FIG. 3B is a partial expanded view of the portion within the dotted frame in FIG. 3A.
Figure 3B:
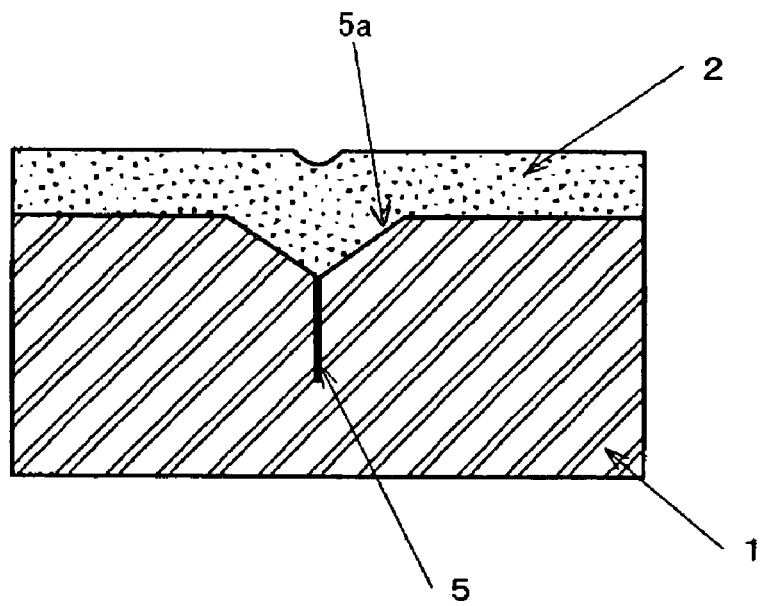

A method of manufacturing an optical device (filter) in accordance with the present invention is shown in FIGS. 1A to 3, where FIG. 1A is a vertical section through an optical wafer, FIG. 1B is a plan view thereof, FIG. 2 is a partial expanded plan view of the portion within the dotted frame A in FIG. 1A, FIG. 3A is a vertical section through an optical wafer provided with an optical thin film, and FIG. 3B is a partial expanded view of the portion within the dotted frame B in FIG. 3A.

With this invention, the optical filter is formed of multiple layers of the three optical chips 1a, 1b, and 1c, each formed of an optical material with the infrared-cutting optical thin film 2 on both main surfaces thereof, as described above, bonded together by the adhesive 3 (see FIG. 5). With the present invention, the optical chip is basically formed by first, second, and third steps.

In the first step, hairline cracks (scribed grooves or scratched grooves) 5, which define the optical chips that will be divided by means such as a rotary cutter having a diamond blade edge, are formed in one main surface of each of optical wafers 1A, 1B, and 1C that have been created by polishing the surfaces of an optical material to a mirror finish (see FIG. 1A). In this case, roughly V-shaped grooves 5a are formed in the optical wafer by pressing the diamond blade edge against the optical wafer 1, to form each hairline crack 5 in the end portion of the groove (see FIG. 2). Note that if the thicknesses and optical materials of the optical chips 1a, 1b, and 1c are the same, a single optical wafer 1A can be used.

In the second step, the optical thin film 2 is formed by vapor deposition on both main surfaces of the optical wafer 1A (see FIGS. 3A and 3B).

In the third step, the optical wafers 1A, 1B, and 1C are each divided along the hairline cracks 5 formed in one main surface thereof, by the previously described dividing device by way of example, to obtain the individual optical chips 1a, 1b, and 1c.

Figure 4:
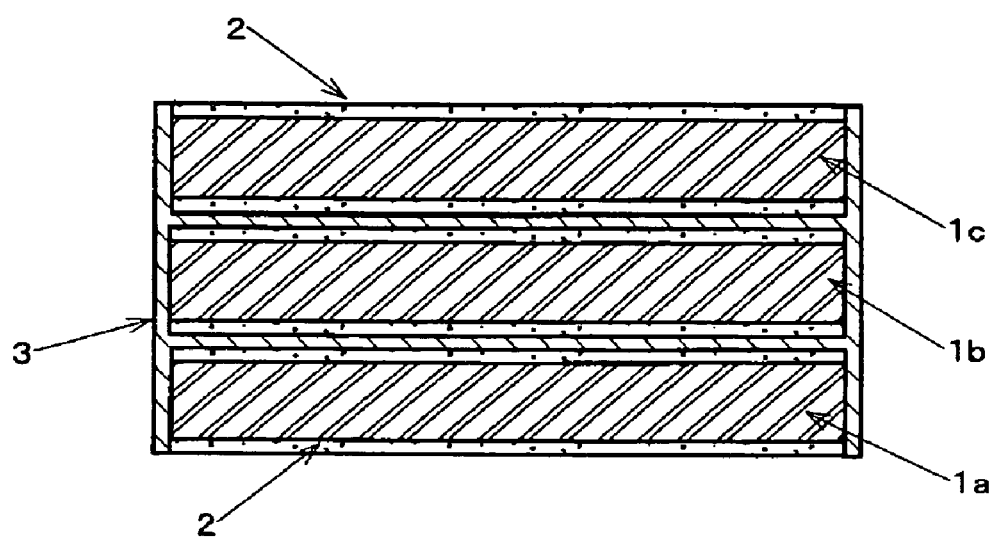
FIG. 4 is a vertical sectional view through the optical filter, illustrating this embodying example of the present invention.

Finally, in a fourth step, the three optical chips 1a, 1b, and 1c are bonded together by the adhesive 3 to form a multi-layer stack. In this case, the adhesive 3 is made to extend towards the outer peripheral side surfaces to protect the burr and prismatic portions formed during the division of the optical wafer (FIG. 4).

Figure 5A:
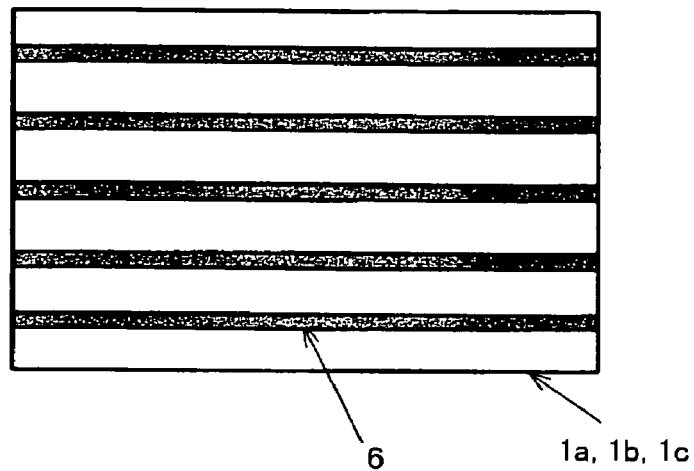
FIG. 5A shows the transmitted wave fronts resulting from the scribing/cutting method and FIG. 5B the transmitted wave fronts resulting from the dicing saw method.
Figure 5B:
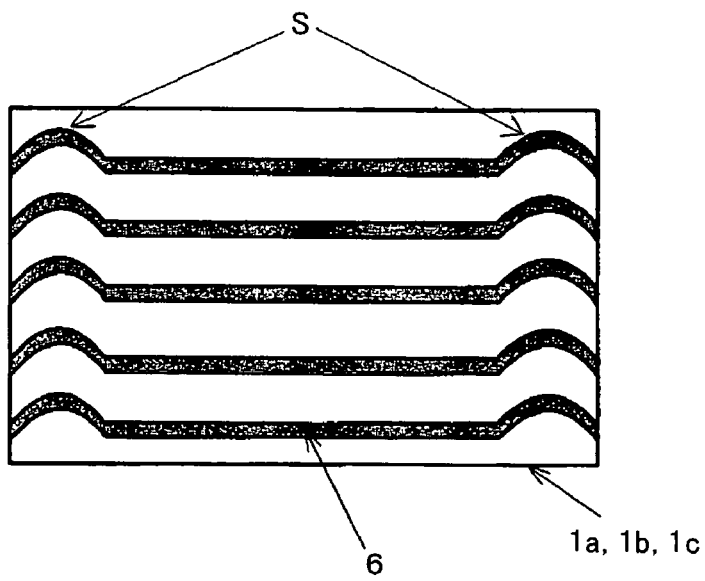
FIG. 5 shows the transmitted wave front characteristics of optical chips (optical filters), illustrating the operation of the embodying example of the present invention, where
Figure 6:
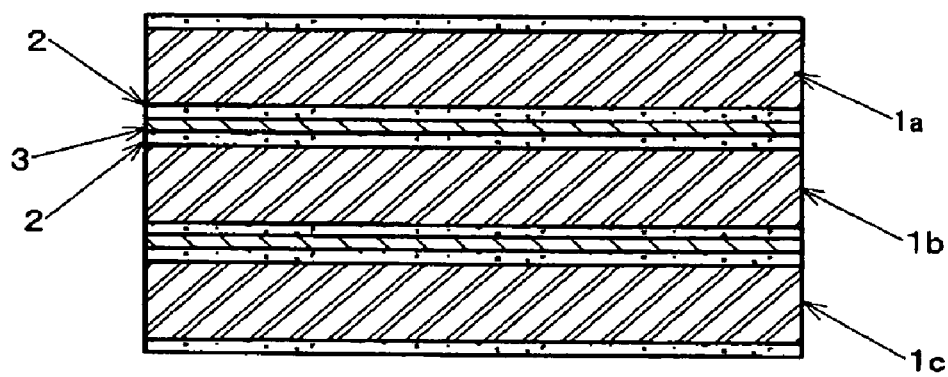
FIG. 6 is a vertical section through an optical filter, illustrating a prior-art example.
Figure 7A:
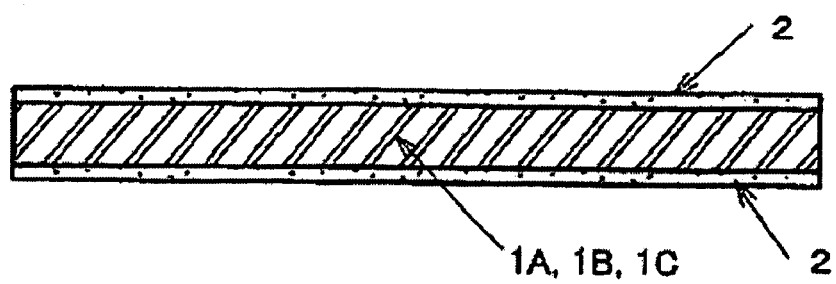
FIG. 7A is a vertical section through the optical filter.
Figure 7B:
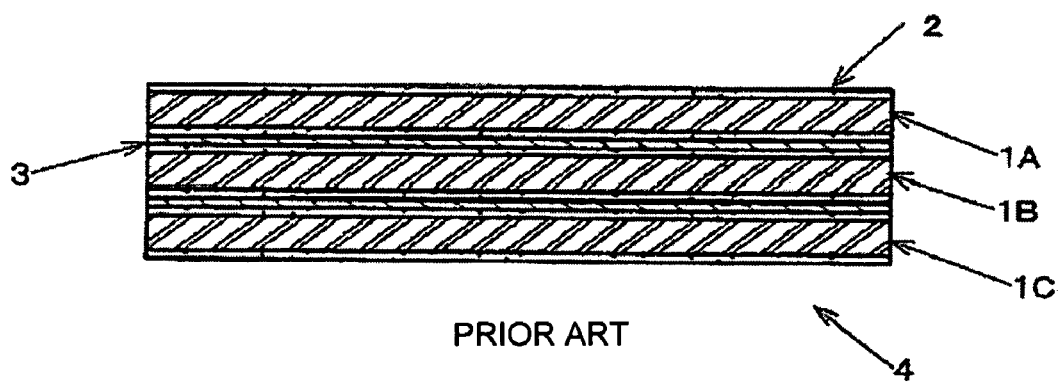
FIG. 7B is a vertical section through a multi-layer optical wafer.
Figure 7C:
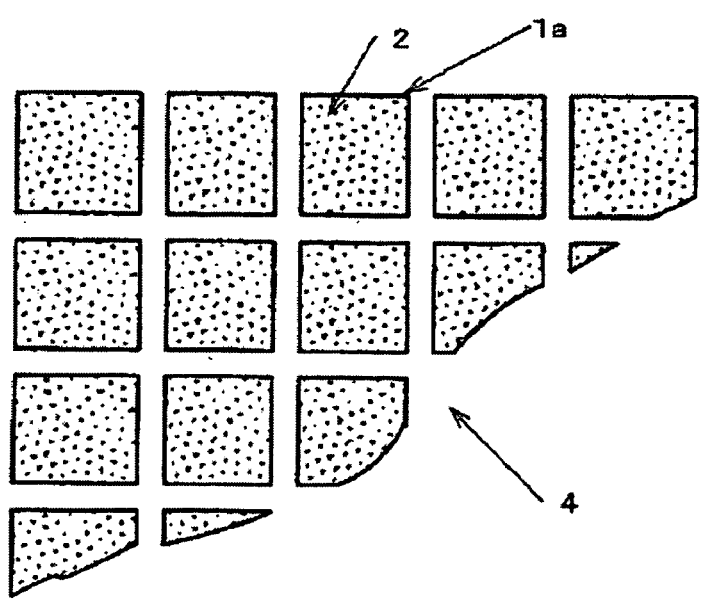
FIG. 7C is a plan view thereof.
Figure 8A:
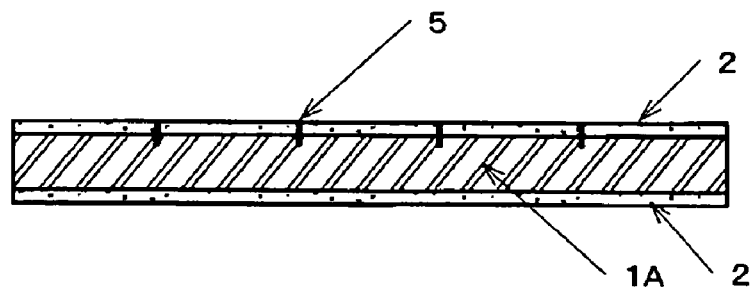
FIG. 8A is a vertical section through the optical wafer and FIG. 8B is a plan view thereof.
Figure 8B:
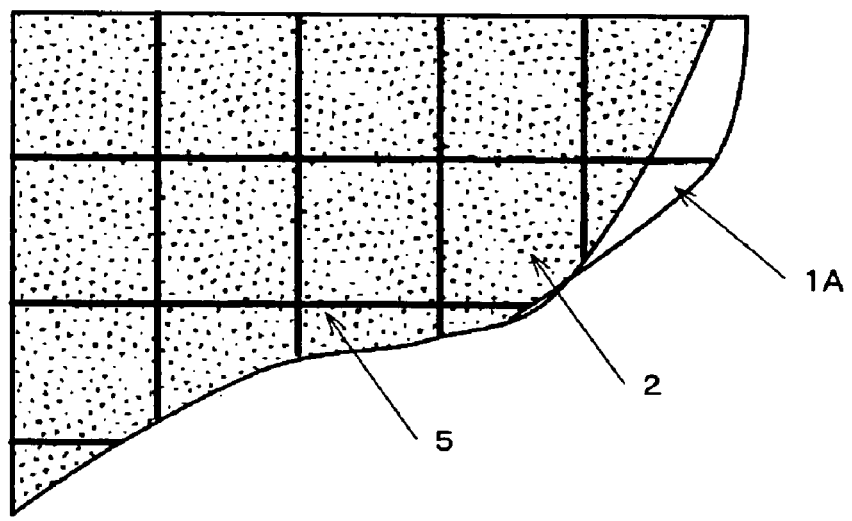

Since above-described manufacturing method in accordance with the present invention divides the optical wafer along the hairline cracks 5 (division lines) formed by a scribing/cutting method in the main surfaces of the optical wafers, there is no frictional resistance such as that seen when the division is done by a dicing saw, suppressing processing distortion that is generated in the split surfaces of the optical chips 1a, 1b, and 1c. The transmitted wave front precision of the optical chips becomes therefore satisfactory, as shown in FIG. 5. In other words, the transmitted wave fronts measured by an interferometer show interference patterns 6 that are in straight lines with no interference distortion over the entire area of the optical chips that have been manufactured by the scribing/cutting method of this embodying example (FIG. 5A), whereas transmitted wave fronts produced by the dicing saw of the prior-art example exhibit interference patterns 6 that are curved and produce interference distortion at the edges (outer peripheral area) of the chips (FIG. 5B).

Since this ensures that the entire surface of each of the optical chips 1a, 1b, and 1c is the effective area, the outer planar shape can be reducing, promoting a smaller device. In addition thereto, since the optical wafers are divided along the hairline cracks 5, there is no generation of wasteful shavings corresponding to the width of the dicing saw, and thus a particularly larger number of optical chips can be produced from the optical wafer 1A, improving productivity. A similar effect can be obtained by bonding the three optical chips 1a, 1b, and 1c together to form a multi-layer type of optical filter.

Since the optical thin film 2 is formed on the surfaces of the wafer (in the second step) after the hairline cracks 5 have been formed by a diamond blade edge in one main surface of the optical wafer 1A (in the first step), the occurrence of fine dust can be prevented during the formation of the hairline cracks 5 after the provision of the optical thin film 2. It is therefore possible to prevent the adhesion of fine dust to the main surfaces of the optical filter, enabling satisfactory maintenance of the optical characteristics thereof.

In addition, the three optical chips 1a, 1b, and 1c are bonded together by the adhesive 3 (in the fourth step) after the optical wafer 1A has been divided by the scribing/cutting method (in the third step). In other words, the present invention ensures that the three optical chips 1a, 1b, and 1c that have been split by the scribing/cutting method from individual optical wafers are placed in a stack, rather than using the scribing/cutting method to divide the multi-layer optical wafer 4 that has been bonded into a stack with the adhesive 3. The scribing/cutting method can therefore be applied to a multi-layer optical filter that has been bonded by adhesive.

This embodiment of the present invention has been described as relating to an optical device that is an optical filter formed from a stack of the three optical chips 1a, 1b, and 1c, but similar effects can be expected for an optical filter formed from a single optical chip, such as a wavelength plate that does not have the optical thin film 2.

Note that the optical material used in the present invention was exemplified by crystal, plastic, or glass comprising IR-cutting glass, but the present invention is particularly effective when crystal is used, because it increases the effective surface area of an optical device made of expensive crystal. The use of plastic or glass has the advantage of a low cost, and the use of IR-cutting glass provides satisfactory weather resistance and a wide spectrum. It should of course be obvious to those skilled in the art that other optical materials could be used therefor.

The invention claimed is:

1. A method of manufacturing low-pass filters, wherein an optical wafer having surfaces that have been polished to a mirror finish is divided into a plurality of optical chips, the method comprising:
   a first step of providing hairline cracks by a diamond blade edge in one main surface of said optical wafer;
   a second step, following the first step, of forming an optical thin film on said optical wafer, after said first step;
   a third step, following the second step, of applying pressure along said hairline cracks to divide said optical wafer into said plurality of optical chips; and
   a fourth step, following the third step, of bonding said optical chips together with an adhesive to form a multi-layer stack, wherein the adhesive extends towards an outer peripheral side surface of said optical chips to protect burr and prismatic portions formed during division of the optical wafer.

2. The method of manufacturing optical devices according to claim 1, wherein said optical chip is formed of an optical material such as crystal, plastic, or glass.

* * * * *